United States Patent
Bauer et al.

[11] Patent Number: 6,105,461
[45] Date of Patent: Aug. 22, 2000

[54] CONTROL UNIT FOR ADJUSTING HEATING, AIR CONDITIONING AND/OR VENTILATION EQUIPMENT IN MOTOR VEHICLES

[75] Inventors: Karl-Heinz Bauer, Bad Neustadt; Joachim Storath, Salz; Walter Voll, Sandberg, all of Germany

[73] Assignee: Preh-Werke GmbH & Co. KG, Bad Neustadt/Saale, Germany

[21] Appl. No.: 09/179,856

[22] Filed: Oct. 28, 1998

[30] Foreign Application Priority Data

Nov. 7, 1997 [DE] Germany .......................... 197 49 214

[51] Int. Cl.[7] ................................................. B60K 37/06
[52] U.S. Cl. .................................. 74/553; 74/567; 74/502
[58] Field of Search ............................... 454/69; 74/567, 74/553, 502; 16/121, 123

[56] References Cited

U.S. PATENT DOCUMENTS

| | | | |
|---|---|---|---|
| 3,891,957 | 6/1975 | Holtkamp | 337/347 |
| 4,790,199 | 12/1988 | Bauer et al. | 74/25 |
| 4,800,466 | 1/1989 | Bauer et al. | 74/553 |
| 5,052,282 | 10/1991 | Scharamm et al. | 454/145 |

FOREIGN PATENT DOCUMENTS

| | | |
|---|---|---|
| 0 149 397 | 7/1985 | European Pat. Off. . |
| 0 457 935 | 11/1991 | European Pat. Off. . |
| 0 879 717 | 11/1998 | European Pat. Off. . |
| 34 34 302 C-3 | 11/1987 | Germany . |
| 196 04 332 | 2/1997 | Germany . |

*Primary Examiner*—David A. Bucci
*Assistant Examiner*—William C Joyce
*Attorney, Agent, or Firm*—Birch, Stewart, Kolasch & Birch, LLP

[57] ABSTRACT

A control unit for adjusting heating, air conditioning, and/or ventilation equipment in motor vehicles has turning knobs (5, 6) and the cam wheels (13, 14) which are connected together. There are adjusting levers (10, 11, 12), with each being mounted by means of two bearing pins (15, 16) in a base part (3), and each adjusting arm (10, 11, 12) being structured as a two-armed lever with one lever arm (17, 18, 19) engaging in a three-dimensional cam plate (20, 21, 22) of the cam wheel (13, 14) in a swivel plane E. Between the lever arm (17, 18, 19) and the three-dimensional cam plate (20, 21, 22), a barrel-shaped or spherical follower element (23) is positioned that cooperates with radial motion-causing walls (24, 25) of the three-dimensional cam plate (20, 21, 22). A control unit of this invention is structured to be space saving, easier and less expensive to produce, and to function in an improved manner.

7 Claims, 4 Drawing Sheets

CONTROL UNIT FOR ADJUSTING HEATING, AIR CONDITIONING AND/OR VENTILATION EQUIPMENT IN MOTOR VEHICLES

BACKGROUND OF THE INVENTION

This invention relates to a control unit for adjusting heating, air conditioning and/or ventilation equipment in motor vehicles of a type including a base part that can be mounted in a dashboard, having a front panel in which one or more turning knobs are arranged which, when turned, adjust adjusting levers connected to pull linkages, with each adjusting lever being rotatably mounted in the base part and being guided by a guiding pin in a guide groove of a cam wheel.

Control units of this kind are frequently mounted in dashboards of motor vehicles, and serve to adjust distribution valves of duct outlets for cool or warm air by so-called Bowden wires, or other linkages.

German patent document (DE 34 34 302 C3) discloses such a control unit that includes a base part that can be mounted in a dashboard, having a front panel in which one or more turning knobs are arranged, each of which turns a first beveled wheel that operates a second beveled wheel, whereby both beveled wheels form a beveled wheel pair having rotational axes that are perpendicular to each other.

The respective second beveled wheels have one or more guide grooves for moving adjusting levers that, on the other ends, cooperate with Bowden wires.

The adjusting levers are one-armed levers (fulcrums at ends), one end of which has a pivot pin set into a pivot bearing of the base part, and the other end of which has the suspended Bowden wire, and between them there is a guiding pin that engages in the guide groove of the second beveled wheel.

Although this control unit according to the prior art functions satisfactorily, there is a need for a structure that is more space-saving, is easier and less expensive to produce, and which functions in an improved manner.

Therefore, it is an object of the invention to provide a control unit according to the opening paragraph above that saves space, is easier and less expensive to produce, and functions in an improved manner.

According to principles of this invention, a control unit has a turning knob and a cam wheel which are connected together, an adjusting lever mounted in the base part by two bearing pins with the adjusting lever being structured as a two-armed lever (fulcrum in middle) and having one lever arm in a swivel plane E that engages in a three-dimensional cam-guide member of the cam wheel and a barrel-shaped or spherical follower element positioned between the lever arm and the three-dimensional cam-guide member that cooperates with radial, motion-causing, walls of the three-dimensional cam-guide member.

BRIEF DESCRIPTION OF THE DRAWING

The invention is described and explained in more detail below using an embodiment shown in the drawings. The described and drawn features can be used individually or in desired combinations in other embodiments of the invention. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
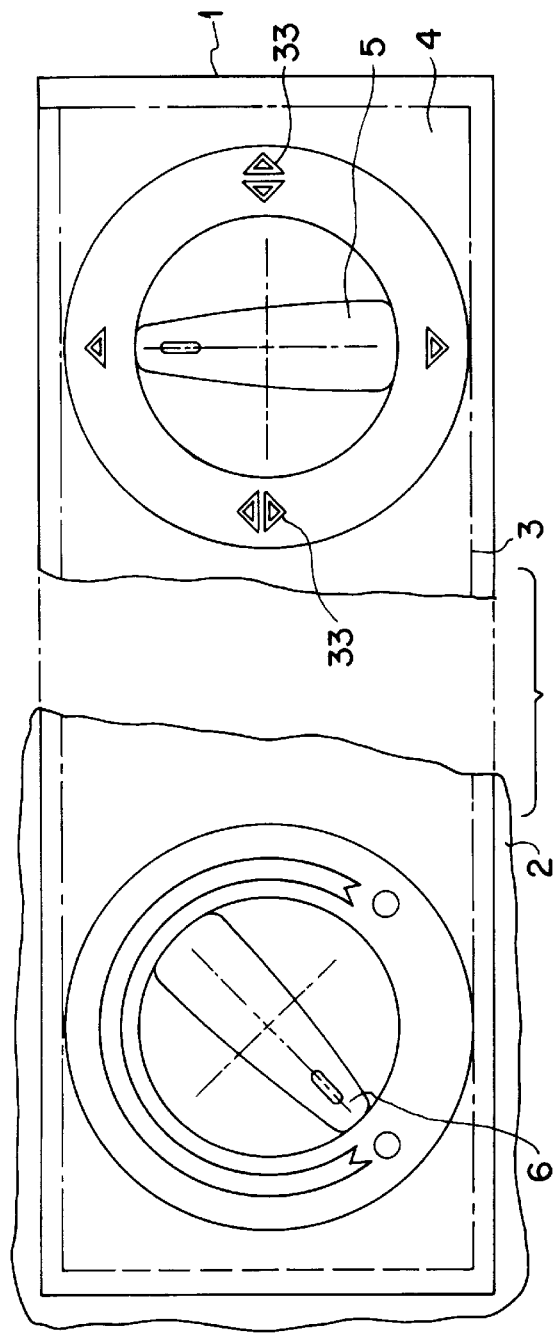
FIG. 1 is a front view of a front panel of a control element of this invention in a dashboard.

FIG. 1 shows a view of a control element 1 for adjusting heating, air conditioning, and/or ventilation equipment in motor vehicles, including a base part 3, set into a dashboard 2, having a front panel 4 into which one or more turning knobs 5, 6 are set.

These turning knobs 5, 6, when turned, allow adjustment of adjusting levers 10, 11, 12 (FIG. 5) connected to Bowden wires 7, 8, 9, with each adjusting lever 10, 11, 12 being rotatably mounted on the base part 3, and having a follower pin guided in a guide groove of a cam wheel, or curve wheel 13, 14, as is explained below with reference to additional figures.

Figure 2:
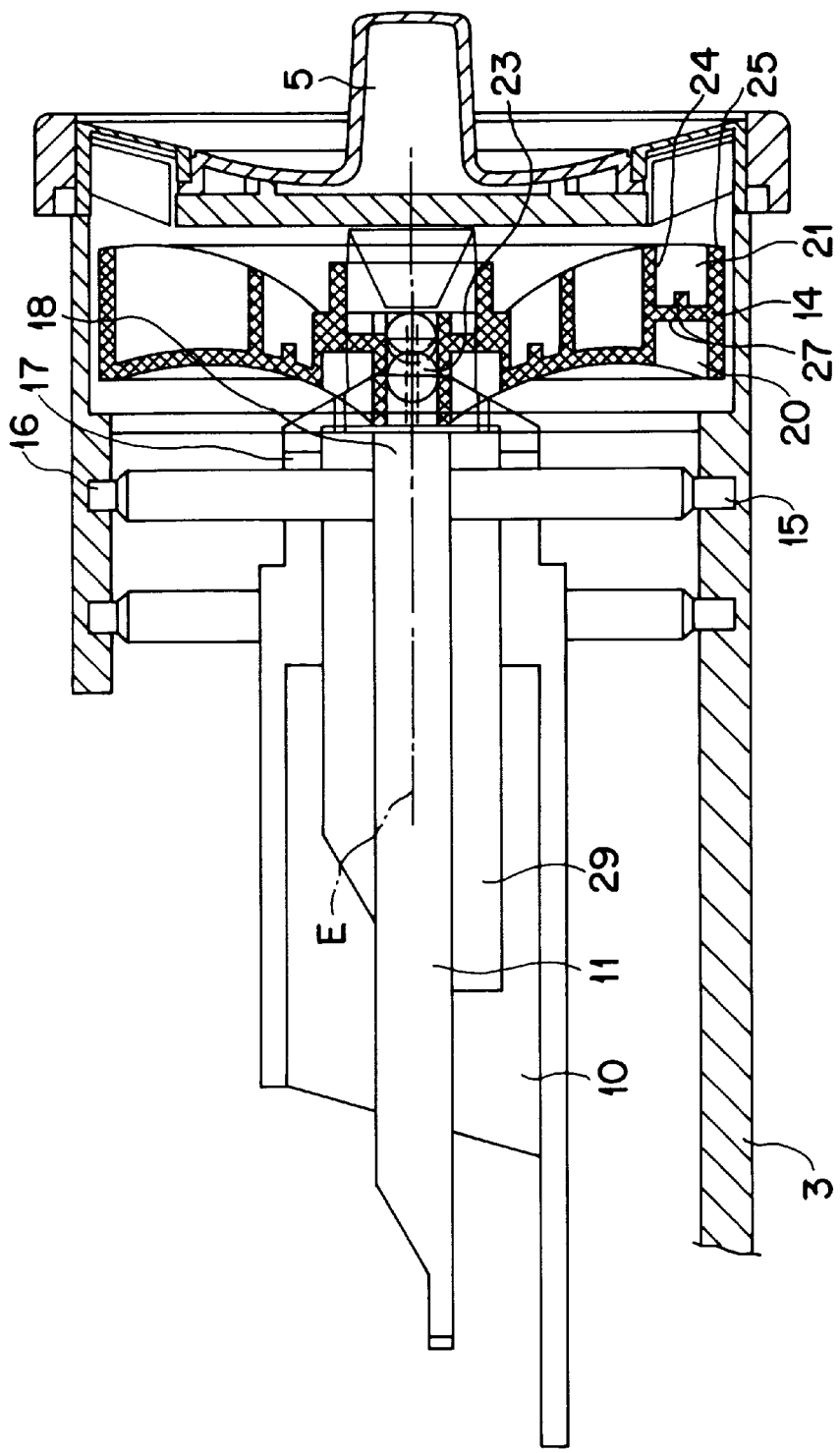
FIG. 2 is a sectional view taken through a right-hand turning knob in FIG. 1.

FIG. 2 is a section taken through the right-hand turning knob 5. FIG. 2 shows that the turning knob 5 and the cam wheel 14 are directly connected to each other, and that each adjusting lever 10, 11 is mounted by two bearing pins 15, 16 in the base part 3 and is structured as a two-armed lever (fulcrum in middle), with one lever arm 17, 18, in a swivel plane E, engaging three-dimensional cam-guide members, or curves, or guides, 20, 21 on the front and back of the cam wheel 14. A connection between each of the lever arms 17, 18, and a lever arm 19 shown in FIG. 5, and the three-dimensional cam-guide member 20, 21, and a three-dimensional cam-guide member 22 shown in FIG. 5, is provided by a barrel-shaped or spherical follower element 23 that cooperates with radial boundary walls 24, 25 of the three-dimensional cam-guide members 20, 21, 22 forming a guide groove, as explained below with reference to FIG. 6.

Figure 4:
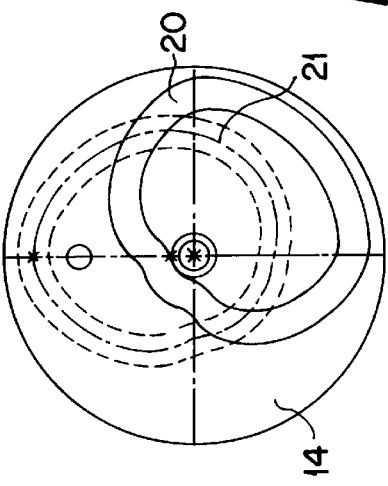
FIG. 3 and FIG. 4 are views of cam wheels of the control element of FIG. 1.
Figure 3:
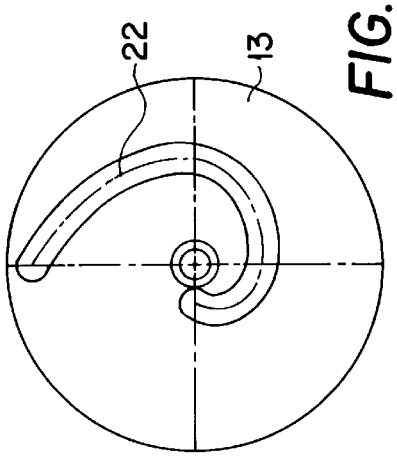

FIG. 3 and FIG. 4 show a view of the cam wheel 13 of the left-hand turning knob 6, for which a three-dimensional cam-guide member 22 is provided for permitting a ¾ circular adjustment, and a view of the cam wheel 14 of the right-hand turning knob 5, in which the three-dimensional cam-guide members 20, 21 are provided for permitting a full circular adjustment, displacing two Bowden wires at the same time.

Figure 5:
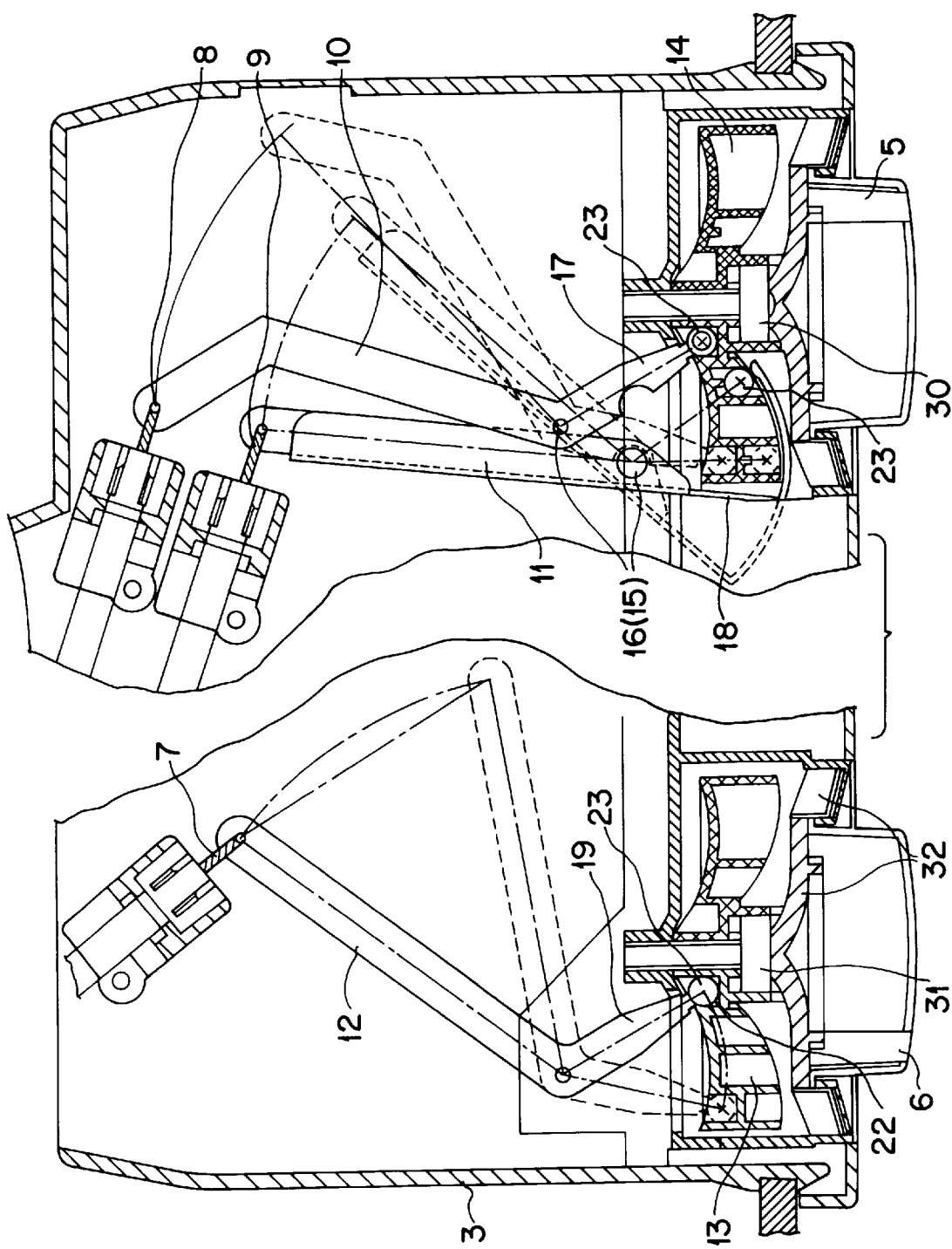
FIG. 5 is a sectional, cutaway, view of the control element of FIG. 1, taken through the centers of the turning knobs.

FIG. 5 shows a section through the control element 1 along rotational centers of the turning knobs 5, 6 and permits views into the base part 3 so that a manner in which the adjusting levers 10, 11, 12 operate can be seen in relation to the adjustment of the Bowden wires 7, 8, 9.

For example, when the right-hand turning knob 5 is turned, and thus also the cam wheel 14, the follower elements 23 in the three-dimensional cam-guide members 20, 21 are guided radially outward into the dashed-line positions, whereby the adjusting levers 10, 11 are also adjusted into the dashed-line positions and the Bowden wires 8, 9 are pulled out. When the left-hand turning knob 6, that operates with the cam wheel 13 which only has the three-dimensional cam-guide member 22, is turned, a corresponding adjustment of the adjusting lever 12 occurs. Switching valves (not shown) connected with the Bowden wires are thus moved into desired positions as marked by visual symbols shown in FIG. 1.

Figure 6:
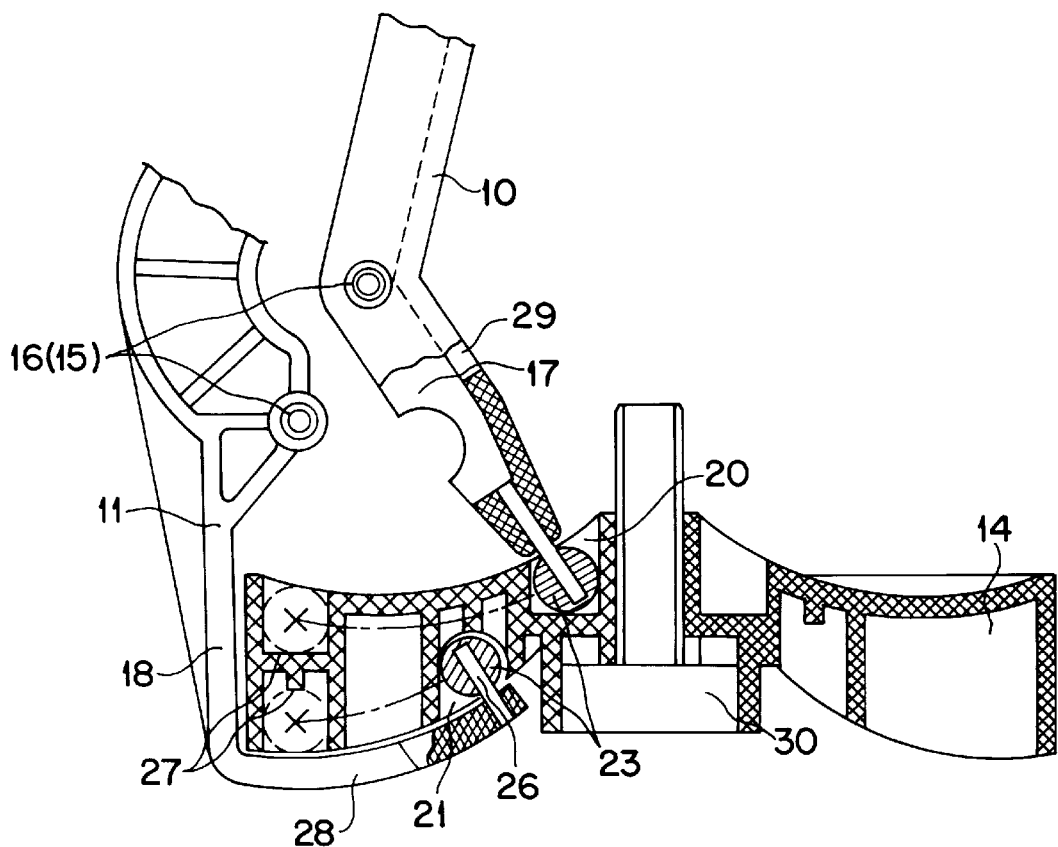
FIG. 6 is an enlarged, simplified, schematic representation of the right-hand part of FIG. 5.

FIG. 6 shows a simplified schematic representation of the right-hand view of FIG. 5, in which can be seen that each follower element 23 is rotatably mounted on a bearing pin 26 of the adjusting lever 10, 11, and is secured by an axial boundary wall 27 of the three-dimensional cam-guide member, or curve, 20, 21, and that each axial face of the cam wheel 14 has a three-dimensional cam-guide members 20, 21 with which the follower elements 23 of the adjusting levers 10, 11 respectively engage.

The boundary walls 24, 25, of the guide-groove-forming three-dimensional cam guides, or plates, 20, 21, which are arranged radially to the rotational center of the cam wheels 13, 14 and parallel to each other, guide and swivel the adjusting levers 10, 11, 12 of the bearing pins 15, 16. The pivoting is made possible by these adjusting arms 10, 11, 12 being structured as two-armed levers, and by the respective three-dimensional cam-guide members 20, 21, 22 being curved in an axial direction of the cam wheels 13, 14 by the axial boundary walls 27, so that a space between the bearing pins 15, 16, or rotational centers of the adjusting levers 10, 11, 12 at the bearing pins 15, 16, and respective engagement points of the follower elements 23 in the three-dimensional cam-guide members 20, 21, 22 can change continuously in accordance with pivoting movement of the adjusting levers 10, 11, 12 in the swivel plane E.

It is provided that the adjusting lever 11 cooperating with the three-dimensional cam-guide member 21 has a sickle-shaped lug 28 encompassing the cam wheel 14 between the cam wheel 14 and front panel 4, which supports the follower element 23 at its outer end, with the adjusting lever 11, when adjusted, traveling into a recess 29 (FIG. 2) of the other adjusting lever 10.

As shown in FIG. 4, the three-dimensional cam-guide members 20, 21 of the cam wheel 14 are structured to be closed loops, whereby the turning knob 5, and the cam wheel 14, as well, can be turned completely through, i.e. they can be placed into any position without requiring return movement.

So that the mentioned symbols 33 on the front panel 4 can be made more visible by illumination, the turning knob and curve arrangement has a central recess 30 into which a light-emitting diode 31 can be placed, that cooperates with a fiber optic structure 32 of the turning knob 5, 6 and the front panel 4.

A control unit according to this invention is thusly structured to be, space saving while being produced more easily and less expensively, and providing improved operation.

Therefore it is suitable for use in motor vehicles.

The invention claimed is:

1. A vehicle ventilation control unit comprised of a base part adapted to be mounted in a dashboard, having a front panel in which at least a first turning knob is arranged that, when turned, adjusts at least a first adjusting lever connected to a linkage, wherein said first adjusting lever is rotatably mounted in the base part and is guided by a first follower element coupled to the first adjusting lever which is located in a first guide groove of a first three-dimensional cam-guide member of a first cam wheel, with the first turning knob being connected to the first cam wheel, and wherein said first adjusting lever is mounted in the base part by two bearing pins and wherein said first adjusting lever is structured as a two-armed lever and having a first lever arm in a swivel plane (E), said first lever arm being coupled to the first follower element that engages in the first guide groove of the first three-dimensional cam-guide member of the first cam wheel, the first follower element cooperating with radial-motion-causing walls defining the first guide groove of the first three-dimensional cam-guide member to cause said first follower element to move radially and axially relatively to said first turning knob.

2. The control unit as in claim 1, wherein the first follower element is placed on a bearing pin of the first adjusting lever so that it can rotate, and is contacted by an axial-motion-causing boundary wall defining the first guide groove of the first three-dimensional cam-guide member.

3. The control unit as in claim 1, wherein the first cam wheel has a second three-dimensional cam-guide member defining a second guide groove opening axially outwardly from a face of the first cam wheel on an opposite side of said first cam wheel than said first guide groove into which a second following element of a second adjusting lever respectively engages.

4. The control unit as in claim 3, wherein the second guide groove defined by said second three-dimensional cam-guide member faces the front panel between the first cam wheel and the front panel, the second adjusting lever having a sickle-shaped lug that encompasses the first cam wheel, with the second follower element thereof being at an outer end of the sickle-shaped lug.

5. The control unit as in claim 4, wherein the second adjusting lever with the sickle-shaped lug, when adjusted, passes through a recess of another adjusting lever.

6. The control unit as in claim 1, wherein there is at least a second turning knob with a second cam wheel connected thereto, with a three-dimensional cam-guide member of the second cam wheel having one guide groove and the first three-dimensional cam-guide member of the first cam wheel having two guide grooves.

7. The control unit as in claim 1, wherein the first cam wheel, has a central recess in which a light-emitting diode is located that cooperates with a fiber optic structure of the turning knob and the front panel.

* * * * *